E. M. CRAWFORD.
SHOCK ABSORBER.
APPLICATION FILED MAR. 24, 1919.
1,323,840.
Patented Dec. 2, 1919.
2 SHEETS—SHEET 1.
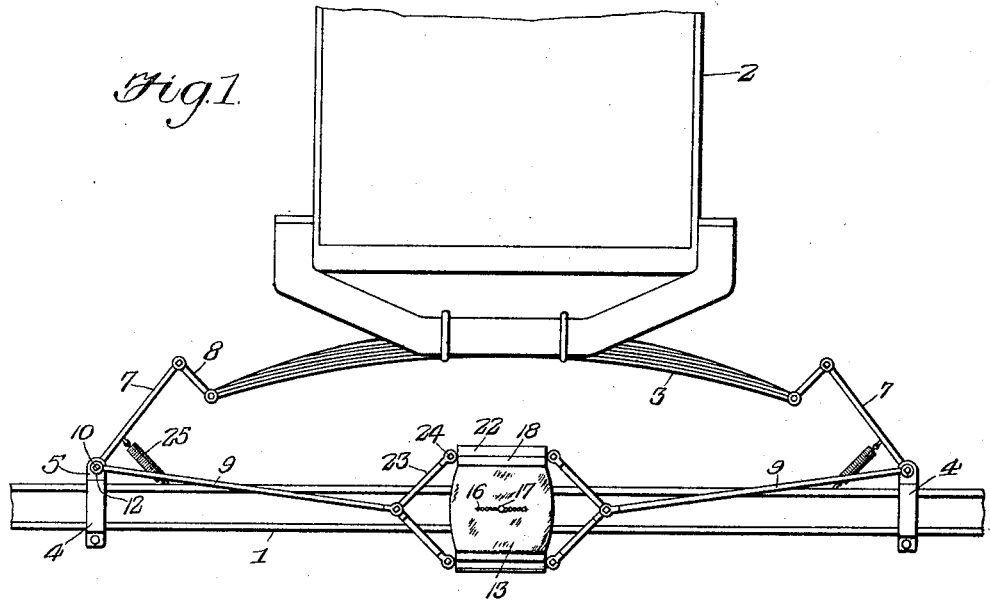
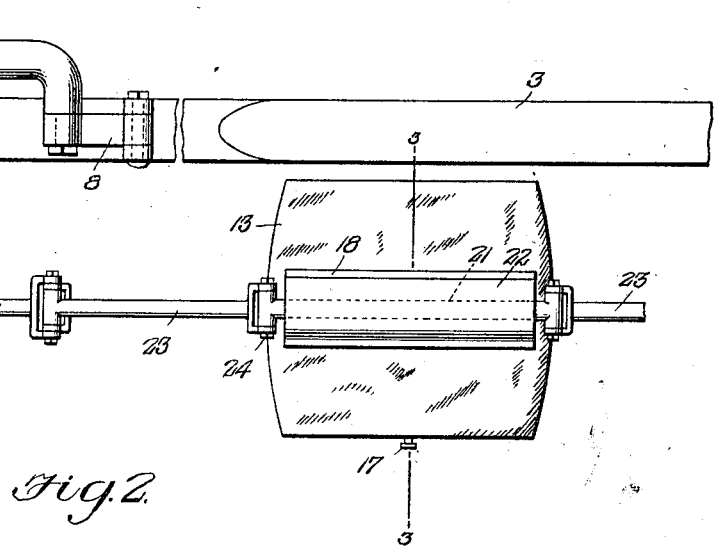
WITNESSES
INVENTOR.
E.M.Crawford,
BY
ATTORNEY.

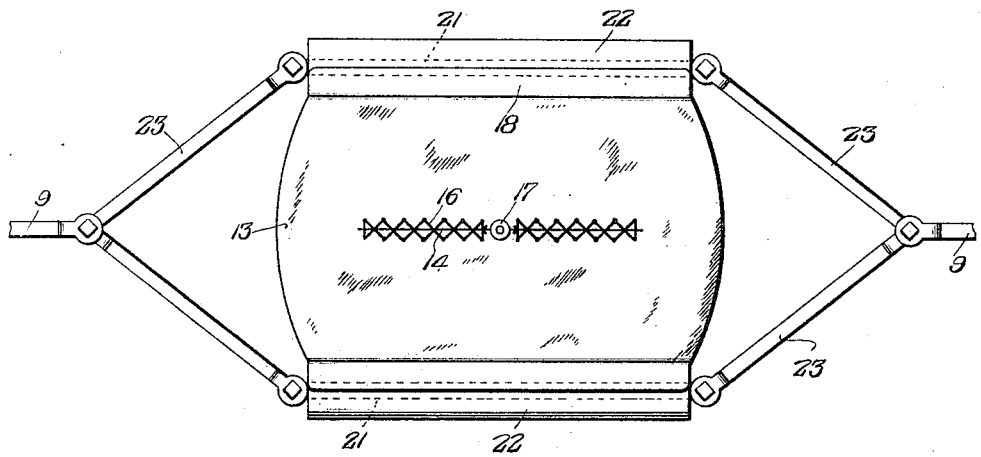
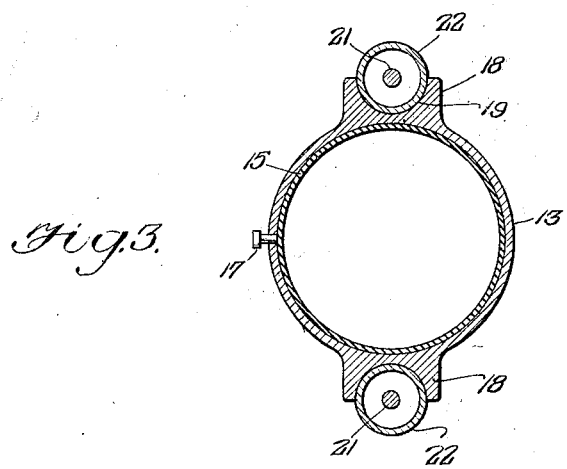

UNITED STATES PATENT OFFICE.

EDWARD M. CRAWFORD, OF RIOGRANDE, TEXAS.

SHOCK-ABSORBER.

1,323,840.  Specification of Letters Patent.  Patented Dec. 2, 1919.

Application filed March 24, 1919. Serial No. 284,625.

*To all whom it may concern:*

Be it known that I, EDWARD M. CRAWFORD, a citizen of the United States, residing at Riogrande, in the county of Starr and State of Texas, have invented new and useful Improvements in Shock - Absorbers, of which the following is a specification.

This invention has reference to a novel construction of pneumatic shock absorber for vehicles and other devices and the principal object of the invention is to make the air container of flexible material so as to decrease the wear on the parts due to vibrations and shocks.

Another object of the invention is to place the flexible air container between elements which will so connect with the vehicle that the movement of the body thereof relative to its running gear, will cause the elements to move toward or away from each other and this movement will be resisted by the air in said container.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of parts of an automobile showing my invention in use;

Fig. 2 is a plan view;

Fig. 3 is a section on line 3—3 of Fig. 2; and

Fig. 4 is an enlarged front view of the air container.

In these views 1 indicates the axle of a vehicle, 2 a portion of the body thereof and 3 one of the supporting springs. The drawings show one arrangement of parts for connecting this spring to the axle whereby my improved shock absorber will act in conjunction with said spring to absorb the shock and jars incidental to the travel of the vehicle along the road. It will be understood, however, that I do not wish to be limited to this particular arrangement of parts.

A pair of brackets 4 is secured to the axle 1 adjacent the end thereof and these brackets support the journals 5 for the shaft 6. An arm 7 is connected with one end of each shaft and the other end of this arm is bent and is connected with the end of the spring by the link 8. The other end of each shaft is extended somewhat and receives one end of a rod 9. The end of this rod is provided with a square opening which receives a square part on the shaft so that the arm must move with the shaft when the same is rotated. The arm is held in place on the shaft by means of a nut 10 engaging a screw-threaded extension 11 of the shaft. A sleeve 12 on the shaft prevents the rod from moving inwardly toward the axle. It will thus be seen that the rods 9 are located a partial distance in front of the axle of the vehicle.

These rods 9 are connected with my improved shock absorber and this absorber consists of a casing 13 made of flexible material such as leather or the like. At one side this casing is provided with a slit 14 for receiving the rubber inner casing 15. After the inner casing is inserted, the slit may be closed by the lacing 16. The inner casing is provided with a stem 17 which is provided with any form of valve to permit the inner casing to be inflated and then held in inflated condition. As will be seen, the stem passes through the slit in the outer casing. The upper and lower portions of the outer casing are provided with the longitudinally extending ribs 18 which are arranged in pairs and each pair forms a semi-circular recess 19. These recesses receive the rods 20 which are inclosed in the sleeves 22. These sleeves are made of hard rubber or like material and are of substantially the same length as the ribs and of such a size as to snugly fit in the space between the ribs. The ends of these ribs are connected with the ends of the rods 9 by the links 23, said links being connected with the rods by the pivot pins 24 so as to provide a hinged connection between the parts. Tension springs 25 are connected with the arms 7 and a part of the axle to retard the upward movement of said arms.

It will thus be seen that when the body of the vehicle moves downwardly the arms 7 will be forced downwardly causing the shaft 6 to turn and thus the arms 9 may be swung downwardly. This action will cause the links 23 to move the rods 20 toward each other but this movement of the rods will be resisted by the air contained in the air container. Thus the downward movement of the body is gradually checked and the compressed air in the container tends to force the parts to return to their normal position.

It will be seen that there is a minimum amount of wear on the device as there are no metal parts being constantly moved against each other by the vibrations of the vehicle. When my container is injured in any way it may be easily replaced at low cost. The tension may be easily regulated by the amount of air in the container and the device can be used on trucks and the like by making the outer casing of heavy and tough material.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described, comprising an outer flexible casing, an inner inflatable casing, upper and lower pairs of ribs on said outer casing, rods held between each pair of ribs, links having their inner ends connected with the ends of said rods, rods connected with the outer ends of said links, a pair of shafts supported by the running gear of the vehicle and connected with said rods and means for connecting the shafts with the body of the vehicle.

In testimony whereof I affix my signature.

EDWARD M. CRAWFORD.